(No Model.) 2 Sheets—Sheet 1.
W. P. CLARK.
DRAFT TUBE FOR EFFERVESCING DRINKS OR OTHER LIQUIDS.
No. 442,611. Patented Dec. 16, 1890.
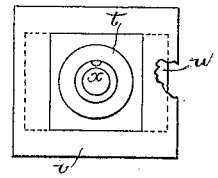
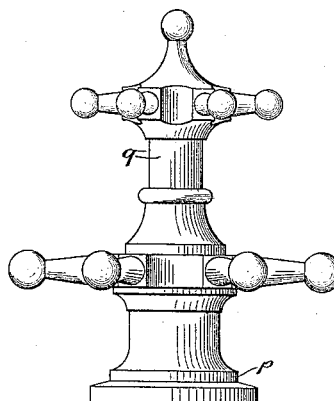
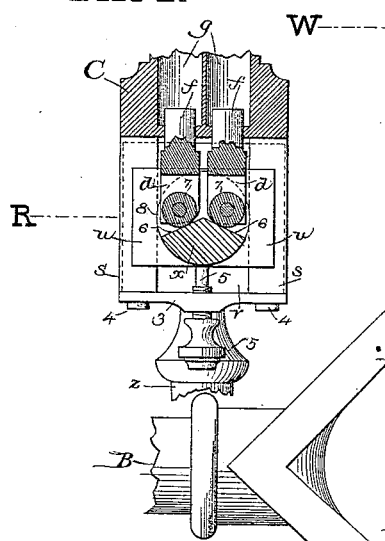
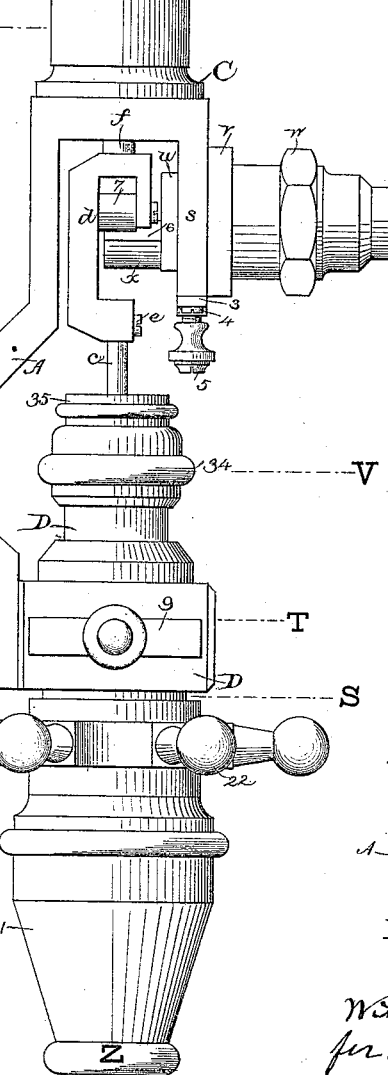
WITNESSES
A. G. Orne
Eugene Humphrey
INVENTOR
William P. Clark
per T. W. Porter Atty (No Model.) 2 Sheets—Sheet 2.
W. P. CLARK.
DRAFT TUBE FOR EFFERVESCING DRINKS OR OTHER LIQUIDS.
No. 442,611. Patented Dec. 16, 1890.
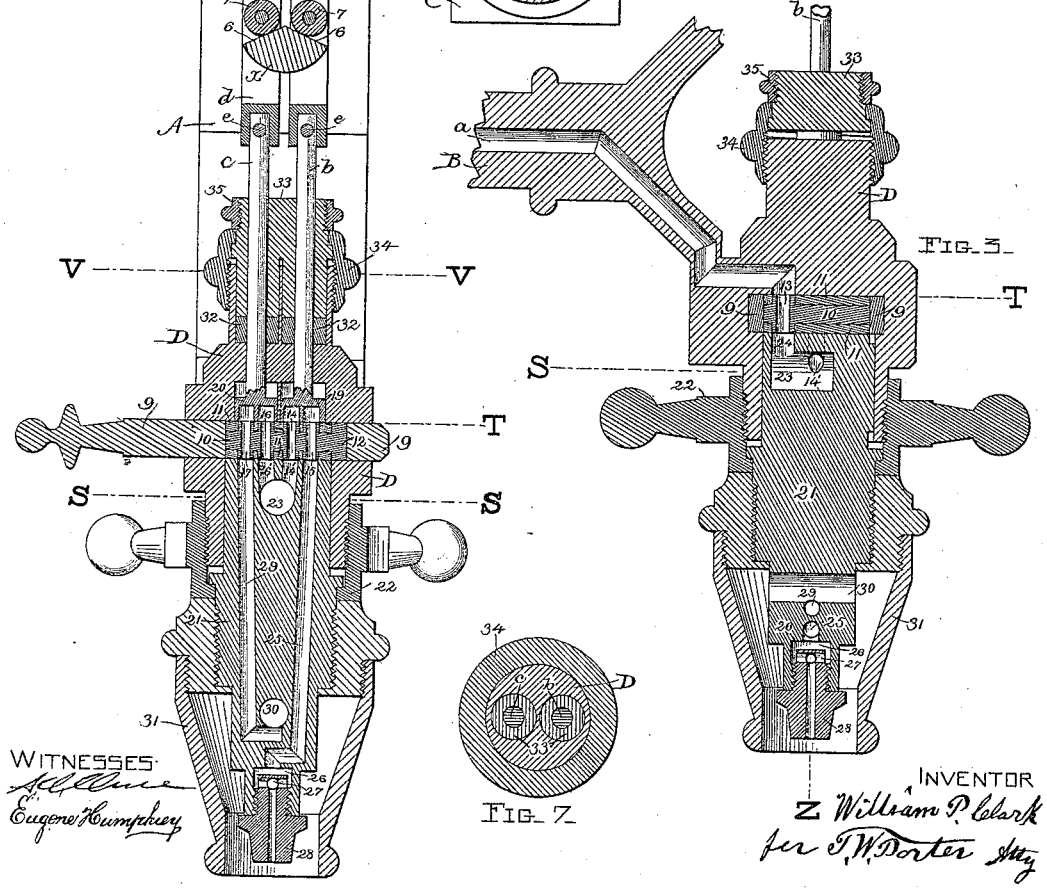

UNITED STATES PATENT OFFICE.

WILLIAM P. CLARK, OF MEDFORD, MASSACHUSETTS.

DRAFT-TUBE FOR EFFERVESCING DRINKS OR OTHER LIQUIDS.

SPECIFICATION forming part of Letters Patent No. 412,611, dated December 16, 1890.

Application filed December 19, 1885. Serial No. 186,157. (No model.)

*To all whom it may concern:*

Be it known that I, WILLIAM P. CLARK, of Medford, in the county of Middlesex and State of Massachusetts, have invented a new and useful Improvement in Draft-Tubes for Effervescing Drinks or other Liquids, which will, in connection with the accompanying drawings, be hereinafter fully described, and specifically defined in the appended claims.
Figure 1 is a side elevation of a draft-tube embodying my invention. Fig. 2 is a longitudinal vertical section taken as on line Z, Figs. 1 and 3, and viewed as from the right therein. Fig. 3 is a longitudinal vertical section of the lower portion of the draft-tube and taken as at right angles to line Z, Figs. 1 and 3. Fig. 4 is a detached vertical section taken as on line Z, Fig. 1, and viewed as from the left therein. Fig. 5 is a transverse section taken as on line W, Figs. 1 and 2. Fig. 6 is a detached view showing in side elevation a part of the valve-depressing devices. Fig. 7 is a transverse section taken as on line V, Figs. 1 and 2. Fig. 8 is a sectional plan view, the section being taken as on line S, Figs. 1, 2, and 3, and the view as from below that line. Fig. 9 is a sectional plan view, the section being taken as on line T, Figs. 1, 2, and 3, and the view as from above that line. Fig. 10 is also a sectional plan view, the section being taken on line T, but the view being as from below that line. Fig. 11 is a detached horizontal section taken on line R, Figs. 1 and 4. Fig. 12 is a detached end elevation of the sleeve $t$, viewed as from the right in Fig. 11 and showing the collar $v$ in place thereon.

My invention relates to the draft-tubes which are employed to draw effervescing and other drinks from soda-fountains and other storage receptacles of beverages and other liquids; and it consists in features of novelty, hereinafter fully described, and pointed out in the claims.

Referring to the drawings, A represents the body of the draft-tube, which is shown as formed with a central angle bracket-like portion, from which extends the inlet-arm B, having conduit or passage $a$, and by which the draft-tube is connected with the supply fountain or conduit, the upper portion C of body A being formed to receive and support the valve-actuating devices, while the lower portion D is formed to receive and support the valves, their immediate coacting devices, and the delivery-nozzles. Said body A may be formed not only as shown, but in great variety of form and style, as adaptation to special use or the taste and fancy of the designor or manufacturer may dictate or render desirable.

The stems of my valves are respectively marked $b$ and $c$, the former being the stem of the "sharp-stream" valve 19 and the latter of the "spray-stream" valve 20.

Before describing the valves, their packing, and the coacting conduits and devices, I will first describe the valve seating and actuating devices. Said valve-stems $b\ c$ are secured at their upper ends in their respective links $d$ by the set-screws $e$. Upon the upper part of said links are the stems $f$, fitted to slide in bearings in portions C of body A, as shown in Figs. 1 and 2.

For the purpose of depressing stems $b\ c$ and seating the valves actuated by them, I form in part C the enlarged passages $g$, Fig. 4, which are axial prolongations of the smaller holes for streams $f$, and in said passages $g$ I place the pins $h$ with their heads $i$ resting upon stems $f$, as shown in Fig. 2. Upon pins $h$ I arrange the helical springs $j$, the lower ends of which rest upon heads $i$ and are preferably soldered thereto, while within passages $g$ and surrounding springs $j$ are the sleeves $k$, which are at their upper ends secured to the disk-like head $l$, which is arranged in sleeve $p$ above part C of body A, said latter sleeve being screw-threaded upon the upper portion of C, as shown in Fig. 2. Two pins $m$, united by disk-like head $n$, pass through holes in head $l$ of sleeves $k$, and are arranged axially in springs $j$ and resting upon pins $h$ with head $n$ somewhat removed from head $l$, as shown, while stem $q$, threaded in the head of sleeve $p$, when turned downward will, by acting upon head $n$, force the same downward, thereby depressing pins $m$ and $h$, when by the action of the latter upon pins $f$ of links $d$ the stems $b\ c$ will be similarly acted upon, and the valves upon said stems will be compressed upon their packing. Stem $q$ is not thus depressed to compress the valves upon their seats except when the apparatus is to be for some time unused or unattended, as when it is being used the stress of springs $j$ is entirely sufficient to hold the valves to their seats upon the packing. Hence said stem $p$ will, except as hereinafter stated, be raised out of possibility of contact with head $n$ when the apparatus is in order for use and that the stem may not interfere with the raising of the valves, which latter movement is effected by the following-described means. Upon the front of part C of body A is formed the depending portion $s$, Figs. 1, 4, and 11, in which is a vertical central slot open at the bottom, in which is fitted to slide freely up and down sleeve $t$, which is formed with head $u$, arranged to bear against the inner face of part $s$, while a collar $v$ is fitted upon sleeve $t$ to bear against the outer face of part $s$, the head $u$ and collar $v$ being held in desired contact with $s$ by means of sleeve $w$, shouldered against sleeve $t$ and threaded thereon, as shown in Fig. 11, said sleeve $t$ being formed rectangular in cross-section at its engagement with part $s$ and collar $v$, as shown in Fig. 12, to prevent its rotation or that of said collar. A bar 3, secured upon the lower face of part $s$ by screws 4, has threaded in its center the screw 5, by actuating which sleeve $t$, against which it bears, may be adjusted and supported at the desired height in part $s$. In sleeve $t$ is journaled rock-shaft $x$, which at its inner end is formed with a circular head 8, recessed in flange $u$ of sleeve $t$, and also has the cam-like faces 6, projecting from said head, which, when shaft $x$ is rocked, will, by acting against rolls 7, respectively pivoted in links $d$, lift the valves, which are at the bottom of the stems secured in the lower end of the links. Upon the outer end of shaft $x$ is mounted sleeve $y$, secured in place by nut 2 and carrying the actuating-lever $z$, said sleeve $y$ and shaft $x$ being interlocked by a spline or key, as shown in Fig. 11. By vibrating lever $z$ in one direction the sharp-stream-valve stem $b$ and its valve will be raised, while by vibrating the lever in the opposite direction stem $c$ is raised for the discharge of the spray-stream, and by the form and arrangement of cam-faces 6 below the axis of shaft $x$ when one link $d$ is thereby raised the other is liberated, and when lever $z$ is released and hangs vertical both links $d$ and their valves are free from the action of the cams and are depressed by their springs $j$, as described.

Having thus described the means of actuating and compressing the valves through their respective stems $b$ $c$, I will next describe the valves, conduits, and coacting devices.

In lower portion D of body A is formed an open slot 18, Fig. 10, in which is seated a packing-holder 9 in a central opening, in which is seated the valve-packing formed with a central metallic disk 10 and an upper and lower disk 11, of leather or other suitable material, said disk 10 having a projection 12, which fits a corresponding side passage in holder 9, thereby preventing the rotation of the packing therein, said projection extending from the plane of disk 10 a distance equal to the thickness of disks 11, which, by being inclosed by holder 9 and said projection 12, are supported at all points of their periphery, and so prevented from extending laterally when subjected to pressure. Said packing is forced against the upper face of slot 18 by conduit-plug 21 and its securing-sleeve 22 threaded on part D. A tube 13, secured in metal disk 10, extends through both the leather disks 11 and is arranged to be coincident with inlet-passage $a$ and passage 24 in the top of conduit-plug 21 said passage 24 communicating with chamber 23, formed near the top of 21, as shown in Figs. 2, 3, and 8, and thus when the liquid is admitted through arm B by conduit $a$ it will pass through tube 13 in the valve and passage 24 in plug 21 and exert a constant pressure in chamber 23.

To draw the liquid from chamber 23 for use, I arrange in disk 10 four tubes, respectively numbered 14 15 16 17, Figs. 2, 9, which extend through both leather disks 11, as shown in Fig. 2, and in the head of conduit-plug 21 are passages coincident therewith, as shown in Fig. 2, those which coincide with the inner tubes 14 16 communicating with chamber 23, while the hole in tube 15 communicates with sharp-stream passage 25 in plug 21, which passage communicates with the small chamber 26 above nozzle 28 and in said plug, the liquid after it enters said chamber passing by cross-passages 27 in nozzle 28 to the axial passage therein, whence it is delivered for use.

At the opposite side of plug 21 is the spray-stream passage 29, which at its top communicates with the hole in tube 17 in the valve-packing, while at its lower end it turns upward, as shown in Fig. 2, and communicates with cross-passage 30 in the lower part of plug 21, whence it is delivered inside the spraying-nozzle 31, from which it falls to the receiving-vessel.

For the purpose of opening and closing passage 14 (through which the liquid passes above the valve-packing from chamber 23 and thence descends through passage 25) the valve 19 is arranged on the lower end of stem $b$, Fig. 2, which valve is raised and seated, as already described, and valve 20, arranged on stem $c$, closes and opens in the same manner hole 16, through which the liquid passes from chamber 23 up through the valve-packing, and thence out through passage 29, as described. Both said valves 19 and 20 are formed and arranged to close and open not only the passage by which the liquid passes above the packing, but also that by which it escaped down through it. The recesses in the lower faces of the valves and the several passages in conduit-plug 21 and in part D of the body, which communicates with the corresponding passages through the valve-packing, are formed of a diameter to freely receive the metal tubes in the packing in order not only to prevent crushing the same when the packing is forced to its seat, but also that the respective faces of the valves and the seat of the packing may only bear upon the yielding portion of the packing. The stems $b\,c$ of the valves are packed by rings 32, seated in part D, and compressed by plunger 33, which is forced down by sleeve 34, interlocked with the plunger, and threaded upon part D, as shown in Figs. 2 and 3, a collar 35 being threaded upon the plunger to be acted upon by the sleeve as the latter is turned upward in order to raise the plunger therewith.

To prevent rotation of valves 19 20 and the consequent displacement of the cavities therein that receive the tubes in the packing, the valves are formed with a shallow groove in their periphery, which receives a corresponding spline formed or secured in part D, as shown in Fig. 10.

If it be desired to limit the extent of rise of the valves 19 20 when opening them in use of the apparatus, then stem $q$ may be adjusted at such height as will allow the required rise before head $n$ encounters said stem; but except in case of such limiting of movement of the valves said stem will be raised out of contact with head $n$, as before stated.

It will be obvious that instead of two valves and corresponding passages through the packing and two delivery-passages the inlet-passage and valve-packing may be arranged as shown and but one valve and one delivery-passage be employed, and also that instead of the links and pins employed in raising, seating, and compressing the valves, stems $b\,c$ may extend directly up into part C of the body and may be of the same diameter as the valves, and be formed with a seat, against which the cam-faces 6 will act to raise them when shaft $x$ is rocked, and the packing may be constructed with the metal disk 10 and only one leather disk, upon which the valves are seated; but I prefer a leather disk upon each side of the metal disk. The tubes of the metal disk, which pass through the leather disks, may be inserted in the metal disk 10, or they may be formed as an integral part thereof, said tubes serving not only to prevent relative displacement of the metal and leather disks, but also to prevent decrease of the size of the passages in the leather, which results from the compression thereof when the tubes are not inserted therein, and said tubes may be employed with a leather packing when the metal disk is omitted.

I claim as my invention—

1. In a draft-tube, the combination of a valve-packing arranged to be seated by upward action of a compressor thereon, the inlet-conduit in the body of the arm, a corresponding passage through the packing and into a chamber in the packing-compressor, a passage leading from said chamber up through the packing, a valve arranged to open and close said upward passage, and a passage arranged to deliver the liquid that passes up through the packing, substantially as specified.

2. In a draft-tube, the combination, with the packing and an upwardly-acting compressor arranged to seat the packing, of an inlet-conduit in the body of the tube, extended into the compressor and thence up through the packing, a valve arranged above the packing to open and close said passage, and a passage arranged to deliver the liquid passing up through the packing, substantially as specified.

3. In a draft-tube, the combination of a valve-chamber formed in the body of said tube and having an offset or shoulder formed to serve as a packing-seat, the packing arranged in said chamber and provided with inlet and outlet passages, a compressor arranged below said packing to force it upward to said seat, and a valve arranged above the packing to seat thereon upon the side opposite said plunger, substantially as specified.

4. In a draft-tube, the combination of a valve-packing disk and a compressing device to seat the same, two independently-acting valves, two inlet-passages arranged in said packing to be respectively opened and closed by said valves, and an outlet-passage for the fluid admitted by each valve, substantially as specified.

5. The combination, with valves 19 20, the packing-disk, and compressor 21, of inlet-passages $a$, the continuation 24, chamber 23, the respective inlet and outlet passages through the packing, and delivery-passages 25 29, substantially as specified.

6. The combination, with the valve-packing having passages 14 15 16 17, arranged to co-act with supply and delivery passages in the draft-tube, of two valves, each arranged to control one of said inlet and one of said outlet passages in the packing, and means whereby when either valve is raised the other is automatically seated upon said packing, substantially as specified.

7. A valve-packing formed with a metallic or incompressible interior disk and having upon each side thereof a compressible facing, said interior disk having tubes projecting through the passages in the compressible facings, substantially as specified.

8. A valve-packing formed with an interior incompressible disk and compressible exterior disks or facings, with coincident passages therethrough, and a projection extending from the edge of said interior disk to interlock in the packing-holder, substantially as specified.

9. The combination of valve-stems $b\,c$, their respective ring-packing 32, seated in the side-by-side chambers in part D, plunger 33, formed in its upper portion as a true cylinder and in its lower portion with two sleeves, each with an exterior diameter about equal the radius or half diameter of the upper portion and respectively seated in said side-byside chambers, and the compressing-sleeve 34, interlocked with said plunger and threaded upon part D of the draft-tube, substantially as specified.

10. The combination, with the valves and their packing-disk, of plunger 21, arranged at the side of said disk opposite to said valves, and sleeve 22, interlocked with and arranged to force said plunger against the packing and toward the valves, substantially as specified.

11. The combination, with the valves and their stems, arranged side by side and having each a contact projection or roll arranged in the same horizontal plane, of a rock-shaft having an actuating handle or lever, and two engaging cams oblique to each other and having their apex or intersecting line at or near the axis of said rock-shaft and between said contact projections of the valve-stems, whereby one of said valves is released by the act of raising the other, substantially as specified.

12. The combination, with rock-shaft $x$, of sleeve $t$, formed with head $u$ and rectangular in cross-section in part of its length, collar $v$, fitted upon such rectangular portion, and sleeve $w$, threaded upon and shouldered against said sleeve, substantially as specified.

13. Rock-shaft $x$, provided with an actuating-lever and formed with cam-faces 6, in combination with links $d$, connected with the valve-stems, substantially as specified.

14. The combination of the valve-stems, the links, pins $h$, springs $j$, and compressing-sleeve $p$, substantially as specified.

15. The combination of compressing-screw $q$, pins $m$, united by head $n$, pins $h$, links $d$, and the valve-stems, all substantially as specified.

16. The combination, with the valves, their stems, and seats $i$, thereby supported, of springs $j$, arranged upon said seats, and cap $l$, arranged upon said springs, with means to force it downward to compress said springs to seat the valves, substantially as specified.

17. The combination, with the valves, their stems, and rock-shaft $x$, arranged to lift said valves, of adjustable sleeve $t$, having said rock-shaft journaled therein, and screw 5, arranged to act against said sleeve to adjust said rock-shaft, substantially as specified.

18. The combination, with the valves and their stems, and seats $i$, thereby supported, and having stems $h$, of springs $j$, arranged on seats $i$ and embracing said stems, and sleeves $k$, having head $l$ resting upon said springs, and means to force it downward, substantially as specified.

19. The combination, with seats $i$, supported by the valve-stems and having stems $h$ arranged in the axis of springs $j$, of pins $m$, seated upon pins $h$ and having head $n$, and a locking-screw $q$, arranged above cap $n$ to act thereon, substantially as specified.

20. The combination, with the valves and their stems, of seats $i$, supported upon said stems, pins $h$, rising from said seats, springs $j$, arranged upon said pins and resting upon said seats, sleeves $k$, inclosing said springs and having head $l$ resting upon the springs, pins $m$, inserted in the springs and seated upon pins $h$ and having head $n$, compressing-sleeve $p$, threaded upon the portion of the body within which the springs are arranged, and adjusting-screws $q$, threaded in the head of sleeve $p$, all substantially as specified.

21. The combination, with the valves, their stems, and the compressing-springs, with means by which to adjust the stress thereof, of a rock-shaft arranged with its axis perpendicular to that of said stems and provided with cams arranged to engage contact projections of said stems, substantially as specified.

22. The combination, with a valve and its stem, of a spring acting against a seat supported by the valve-stem to seat the valve, a device to adjust the stress exerted by the spring, a pin extended through and above said spring, and a screw arranged to be adjusted relatively to said pin, whereby to regulate the lift of the valve or to hold it to its seat, substantially as specified.

WILLIAM P. CLARK.

Witnesses:
T. W. PORTER,
EUGENE HUMPHREY.